US008278773B2

(12) United States Patent
Murata (10) Patent No.: US 8,278,773 B2
(45) Date of Patent: Oct. 2, 2012

(54) WIND TURBINE GENERATOR AND SURPLUS ENERGY CONTROL METHOD FOR WIND TURBINE GENERATOR

(75) Inventor: Naoto Murata, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/276,352

(22) Filed: Oct. 19, 2011

(65) Prior Publication Data

US 2012/0133342 A1 May 31, 2012

Related U.S. Application Data

(63) Continuation of application No. PCT/JP2011/067949, filed on Aug. 5, 2011.

(51) Int. Cl.
*F03D 9/00* (2006.01)
(52) U.S. Cl. .................. 290/44; 290/55; 416/132 B
(58) Field of Classification Search .............. 290/43, 290/44, 54, 55; 417/282; 416/132 B
See application file for complete search history.

(56) References Cited

U.S. PATENT DOCUMENTS

| 4,441,872 | A  | * | 4/1984 | Seale | 417/282 |
|---|---|---|---|---|---|
| 7,329,099 | B2 | * | 2/2008 | Hartman | 416/132 B |
| 7,385,301 | B2 | * | 6/2008 | Hirsch | 290/42 |
| 7,911,071 | B2 | * | 3/2011 | Devine | 290/1 R |
| 2011/0115223 | A1 | * | 5/2011 | Stahlkopf et al. | 290/7 |

FOREIGN PATENT DOCUMENTS

| JP | 58049096 A | 3/1983 |
|---|---|---|
| JP | 61211196 A | 9/1986 |
| JP | 5022999 A | 1/1993 |
| JP | 5252782 A | 9/1993 |
| JP | 6070573 A | 3/1994 |
| JP | 2000009021 A | 1/2000 |
| JP | 2001086647 A | 3/2001 |
| JP | 2002315395 A | 10/2002 |
| JP | 2002354856 A | 12/2002 |
| JP | 2003087993 A | 3/2003 |
| JP | 2004218436 A | 8/2004 |
| JP | 2006117179 A | 5/2006 |

OTHER PUBLICATIONS

International Search Report of PCT/JP2011/067949 dated Nov. 8, 2011.

* cited by examiner

*Primary Examiner* — Nicholas Ponomarenko
(74) *Attorney, Agent, or Firm* — Kanesaka Berner & Partners LLP (57) ABSTRACT

A wind turbine generator includes a synchronous generator that generates electric power via rotation of a rotor provided with blades that receive wind and that supplies the generated electric power to a utility grid, and a sea water resistor in which sea water serves as a resistive element. When the output power of the synchronous generator drops suddenly because of a momentary power interruption caused by a fault occurring on the utility grid, thus producing surplus energy, the sea water resistor consumes, in the form of electric power, the surplus energy that cannot be supplied to the utility grid from among the electric power generated at the synchronous generator. Because the sea water resistor uses sea water as the resistive element, the problem of heat generation hardly ever arises, and because the sea water can be easily exchanged, it is not affected by lifetime or on-time limitations.

6 Claims, 7 Drawing Sheets

WIND TURBINE GENERATOR AND SURPLUS ENERGY CONTROL METHOD FOR WIND TURBINE GENERATOR

RELATED APPLICATIONS

The present application is continuation of, and claims priority from, International Application Number PCT/JP2011/067949, filed Aug. 5, 2011, the disclosure of which is hereby incorporated by reference herein in its entirety.

TECHNICAL FIELD

The present invention relates to a wind turbine generator and to a surplus energy control method for a wind turbine generator.

BACKGROUND ART

In a wind turbine generator that supplies generated electric power to the utility grid, even if the voltage at an interconnection point between the wind turbine generator and the utility grid suddenly drops due to a momentary power interruption caused by a fault occurring on the utility grid, the wind turbine generator should continue to operate without being disconnected from the utility grid (LVRT: Low-Voltage Ride-Through).

Figure 7:
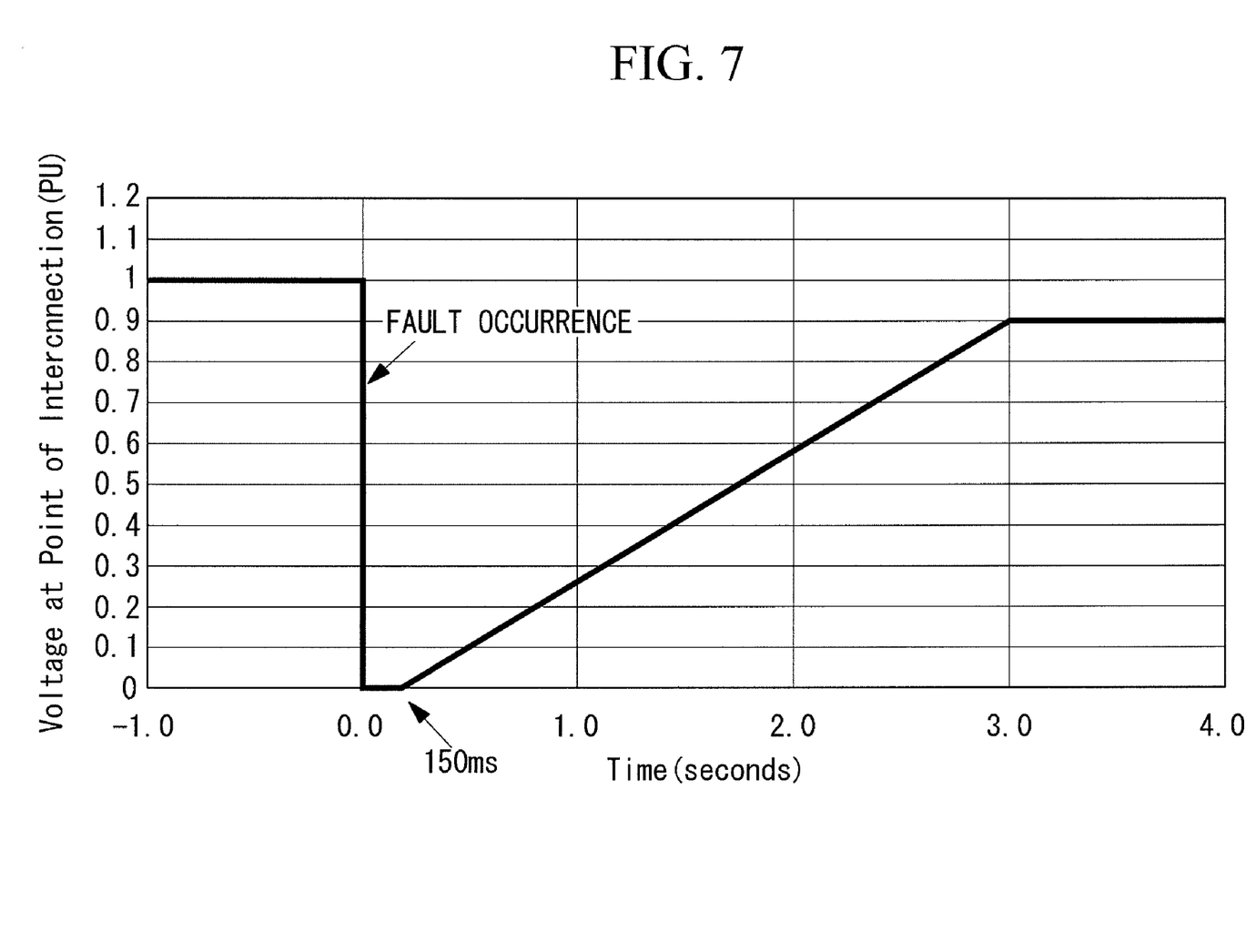
FIG. 7 is a graph showing an example of a voltage drop at a interconnection point.

FIG. 7 is a graph showing an example of a voltage drop at a interconnection point. In the example in FIG. 7, the voltage becomes 0 for 150 ms, and then the voltage recovers to 0.9 PU three seconds after the voltage drop; with LVRT however, the wind turbine generator should continue to operate even during the period until the voltage recovers.

However, when a momentary power interruption or the like occurs in wind turbine generators, causing the generator output to drop suddenly, the output power becomes small relative to the input power to a synchronous generator, and the rotor of the generator is accelerated by surplus energy during the period until the generator input power is reduced.

In a system in which an induction generator is directly coupled to the utility grid, or a system in which the generator is coupled to the grid via an inverter, over-rotation of the generator due to the surplus energy should be prevented.

On the other hand, in a system in which a synchronous generator is directly coupled to the utility grid, the input energy to the generator should be instantaneously suppressed with high precision, or an increase in the rotational speed should be suppressed by consuming the output energy of the generator to control the generator so that it does not fall out of synchronization.

Therefore, Patent Literature 1, for example, describes a control method in which a damping resistance close to the target generator is turned on/off to cause the surplus energy to be consumed by the damping resistance in the form of electric power, in order to suppress acceleration of the generator in the system when a fault occurs on the utility grid, thus stabilizing the system.

CITATION LIST

Patent Literature

{PTL 1} Japanese Unexamined Patent Application, Publication No. 2001-86647

SUMMARY OF INVENTION

Technical Problem

However, with a method involving use of a resistance, like that described in Patent Literature 1, a large-capacity resistance is needed, and there is also the problem of lifetime and on-time limitations due to heat generation.

The present invention has been conceived in light of such circumstances, and an object thereof is to provide a wind turbine generator and a surplus energy control method for a wind turbine generator that are not affected by lifetime or on-time limitations and that can consume surplus energy with a fast response speed.

Solution to Problem

A wind turbine generator according to a first aspect of the present invention includes a rotor provided with a blade that receives wind; a synchronous generator that generates electric power by rotation of the rotor and that supplies the generated electric power to a utility grid; and a liquid resistor in which sea water serves as a resistive element and which consumes surplus electric power that cannot be supplied to the utility grid from among the electric power generated at the synchronous generator.

With the above-described configuration, the synchronous generator generates electric power by rotation of the rotor provided with the blade that receives wind and supplies the generated electric power to the utility grid. However, when a momentary power interruption occurs due to a fault occurring on the utility grid, the output power from the synchronous generator may suddenly drop.

In such an event, the output power becomes small relative to the input power of the synchronous generator, producing surplus energy, which causes the rotor of the synchronous generator to accelerate. In addition, because a voltage drop on the utility grid is a fault that occurs instantaneously, the wind turbine generator must respond rapidly to the voltage drop.

Thus, by providing the wind turbine generator with a liquid resistor in which sea water serves as the resistive element, and by consuming the surplus electric power that cannot be supplied to the utility grid from among the electric power generated at the synchronous generator, the rotor of the synchronous generator can be prevented from accelerating.

The liquid resistor in which sea water serves as the resistive element is hardly affected by the heat generation problem because it uses sea water, and sea water exchange is also straightforward; therefore, it does not have lifetime or on-time limitations, and the response speed for consuming energy in the form of electric power is fast.

Therefore, this configuration is not affected by lifetime or on-time limitations and can consume surplus energy with a fast response speed. In addition, because this configuration can prevent disconnection of the wind turbine generator by consuming the surplus energy, it also contributes to stabilization of the utility grid.

The first aspect described above preferably further includes a power conversion unit, provided between an output terminal of the synchronous generator and the liquid resistor and formed of a semiconductor switch, for controlling the electric power sent to the liquid resistor by varying a firing angle of the semiconductor switch.

With the configuration described above, the electric power sent to the liquid resistor is controlled by varying the firing angle of the semiconductor switch constituting the power conversion unit; therefore, it is possible to easily control the electric power consumed in the liquid resistor. The semiconductor switch is, for example, a thyristor, a triac, or the like.

The first aspect described above preferably further includes an angular speed detecting unit for detecting an angular speed of a rotating shaft of the synchronous generator; wherein the electric power sent to the liquid resistor is controlled so that the angular speed detected by the angular speed detecting unit is held at a synchronous speed.

With the configuration described above, the electric power sent to the liquid resistor is controlled so that the angular speed of the rotation shaft of the synchronous generator is kept at the synchronous speed; therefore, disconnection of the wind turbine generator is reliably prevented, and after the voltage drop in the utility grid is removed, the wind turbine generator can perform normal operation without delay.

In the first aspect described above, preferably, in the liquid resistor, sea water is taken into a vessel from the sea, and the height of the liquid surface in the vessel is kept at a prescribed value.

With the configuration described above, because the height of the liquid surface in the liquid resistor is kept constant, it is possible to prevent variations in the resistance of the liquid resistor.

The first aspect described above preferably further includes a hydraulic motor that speeds up the rotation speed of the rotor and transmits the sped-up rotation to the synchronous generator; and an accumulator that stores hydraulic oil flowing in and out of the hydraulic motor.

With the configuration described above, to speed-up the rotation speed of the rotor and then transmit it to the synchronous generator, as well as using a hydraulic motor, an accumulator that stores hydraulic oil that flows into and out of the hydraulic motor is provided; therefore, surplus energy produced due to a small voltage drop in the utility grid can be absorbed in the accumulator.

A surplus energy control method for a wind turbine generator according to a second aspect of the present invention is a surplus energy control method for a wind turbine generator equipped with a rotor that is provided with a blade that receives wind, a synchronous generator that generates electric power by rotation of the rotor and that supplies the generated electric power to a utility grid, and a liquid resistor in which sea water serves as a resistive element, the surplus energy control method including a first step of detecting a voltage drop in the utility grid; and a second step of sending surplus electric power that cannot be sent to the utility grid, which occurs due to the voltage drop in the utility grid, to the liquid resistor and causing the electric power to be consumed therein.

Advantageous Effects of Invention

The present invention provides a notable advantage in that it is not affected by lifetime or on-time limitations and can consume surplus energy with a fast response speed.

DESCRIPTION OF EMBODIMENTS

Embodiments of a wind turbine generator and a surplus energy control method of a wind turbine generator according to the present invention will be described below with reference to the drawings.

First Embodiment

A first embodiment of the present invention will be described below.

Figure 1:
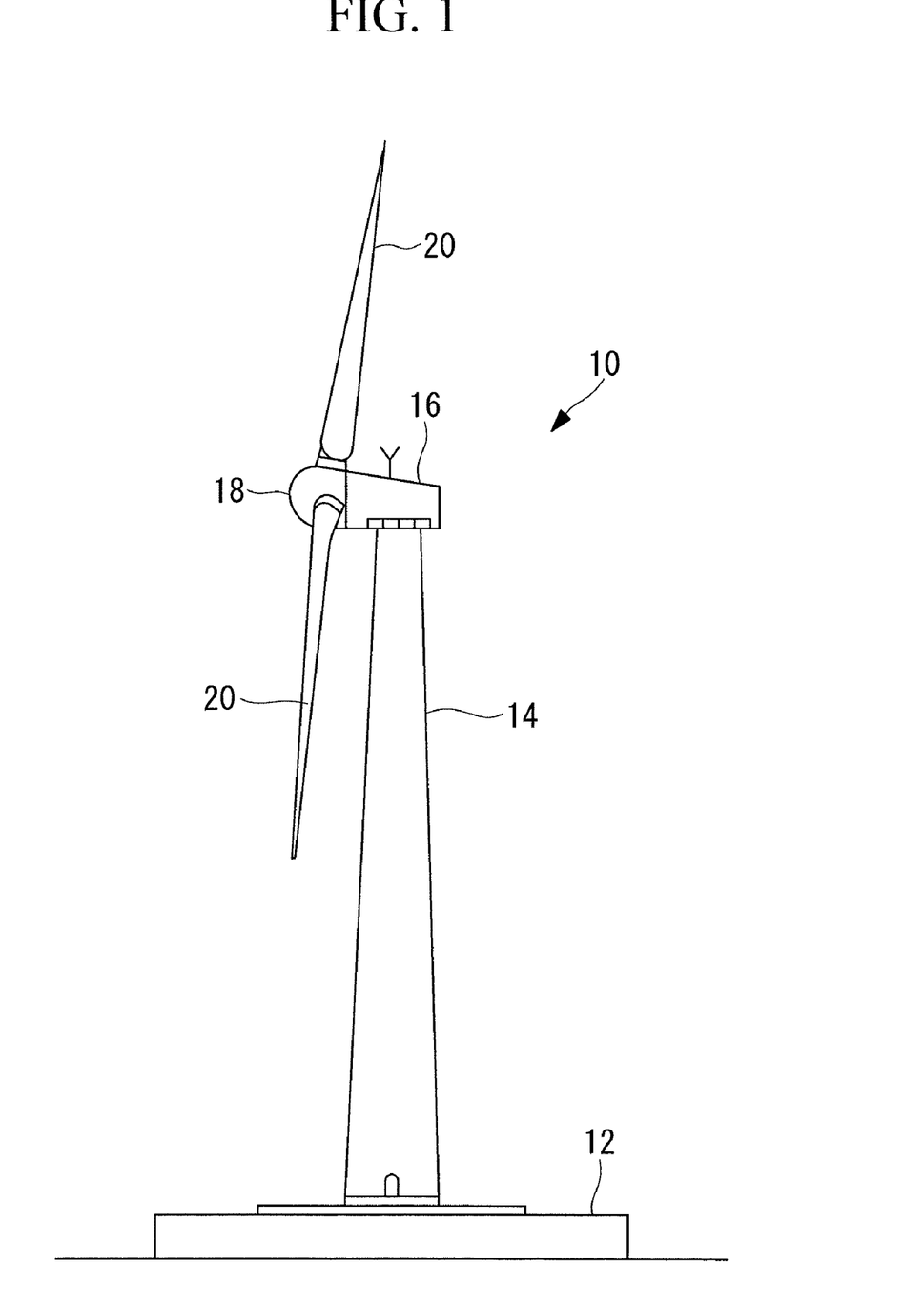
FIG. 1 is an external view of a wind turbine generator according to a first embodiment.

FIG. 1 is an external view of a wind turbine generator 10 according to the first embodiment.

The wind turbine generator 10 according to the first embodiment is a grid-connected system for supplying generated power to the utility grid and is installed in a location where sea water can be employed, such as at sea or along the coast.

The wind turbine generator 10 shown in FIG. 1 has a tower 14 erected upright on a foundation 12, a nacelle 16 installed at the top of the tower 14, and a rotor 18 provided on the nacelle 16 in a manner enabling rotation about a substantially horizontal axis.

A plurality of (for example, three in the first embodiment) blades 20 are provided on the rotor 18 in a radiating pattern about the rotational axis thereof. Thus, the force of wind striking the blades 20 from the direction of the rotational axis of the rotor 18 is converted to a mechanical power that rotates the rotor 18 about the rotational axis, and this mechanical power is converted to electrical power by a synchronous generator 30 (see FIG. 2). Note that the blades 20 are coupled to the rotor 18 so as to be capable of rotating relative to the wind direction, so that the pitch angle of the blades 20 can be changed.

Figure 2:
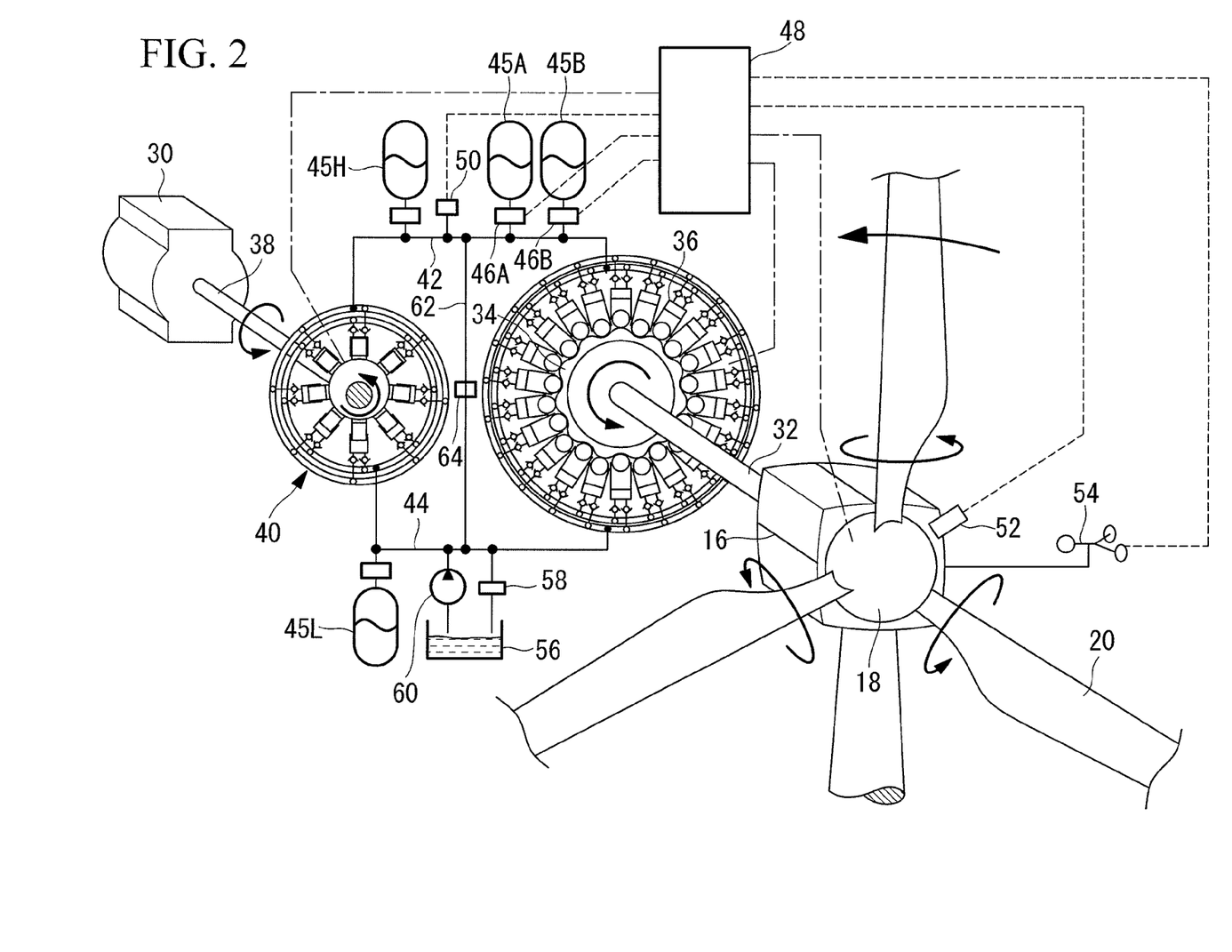
FIG. 2 is a schematic diagram showing the structure inside a nacelle, in which the rotation of a rotor is speed-up using hydraulic pressure and is transmitted to a generator according to the first embodiment.

FIG. 2 is a schematic diagram showing the structure inside the nacelle 16, which speeds up the rotation of the rotor 18 according to the first embodiment by using hydraulic pressure and transmits it to the synchronous generator 30.

A rotor shaft 32 is provided on the rotor 18, towards the interior of the nacelle 16, and a circular cam (hereinafter referred to as star-shaped cam) 34 in which a plurality of peaks and valleys are alternately provided in the circumferential direction is connected to the end of the rotor shaft 32.

A plurality of hydraulic pumps 36 that pump hydraulic oil inside cylinders using pistons are provided in the circumferential direction of the star-shaped cam 34. The pistons of the hydraulic pumps 36 are disposed so as to contact the circumferential surface of the star-shaped cam 34. Thus, the star-shaped cam 34 rotates together with the rotation of the rotor 18, whereby the pistons of the hydraulic pumps 36 alternately contact the peaks and valleys of the star-shaped cam 34. When the pistons of the hydraulic pumps 36 contact the peaks of the star cam 34, the pistons expel the hydraulic oil out of the cylinders, and when the pistons contact the valleys, the pistons suck the hydraulic oil into the cylinders.

On the other hand, a hydraulic motor 40 that speeds up the rotation of the rotor 18 and transmits it to the synchronous generator 30 is provided at the end of a shaft 38 of the synchronous generator 30. In other words, the hydraulic motor 40 is rotated by the hydraulic oil pumped from the hydraulic pumps 36 and rotationally drives the synchronous generator 30.

In the hydraulic motor 40, a plurality of cylinders are disposed in a radiating pattern centered on the shaft 38, and the pistons provided in the cylinders are connected to the shaft 38 via rods. Thus, in the hydraulic motor 40, the hydraulic oil is pumped to the individual cylinders from the hydraulic pumps 36 via a high-pressure manifold 42, whereby the pistons provided in the cylinders undergo reciprocating motion, causing the shaft 38 of the synchronous generator 30 to rotate. Also, the hydraulic oil pushed out from the cylinders of the hydraulic motor 40 is returned to the hydraulic pumps 36 via a low-pressure manifold 44.

The high-pressure manifold 42 is provided with an accumulator 45H that stores hydraulic oil that flows into the hydraulic motor 40, and the low-pressure manifold 44 is provided with an accumulator 45L that stores hydraulic oil that flows out from the hydraulic motor 40.

Also, the high-pressure manifold 42 is provided with an accumulator 45A, via a valve 46A, and an accumulator 45B, via a valve 46B.

The valve 46A and the valve 46B are electrically connected to a valve controller 48, and the degrees of opening thereof are controlled on the basis of control signals from the valve controller 48. The valve controller 48 determines the degrees of opening of the valves 46A and 46B on the basis of a pressure signal indicating the pressure of the hydraulic oil, which is output from a hydraulic sensor 50 provided in the high-pressure manifold 42, a pitch angle signal indicating the pitch angles of the blades 20, an operating signal indicating the operating states of the hydraulic pumps 36, a speed signal indicating the speed of the rotor 18, which is output from a rotor speed sensor 52, a wind-speed signal indicating the wind speed, which is output from a wind-speed sensor 54, and so forth.

Then, the hydraulic oil flows out from the accumulators 45A and 45B according to the degrees of opening of the valves 46A and 46B, and the degree of speed-up is determined according to the pressure of the hydraulic oil.

A reservoir 56 for holding the hydraulic oil is provided in the low-pressure manifold 44. A low-pressure relief valve 58 and a pump 60 are provided between the reservoir 56 and the low-pressure manifold 44. By opening the low-pressure relief valve 58, the hydraulic oil flows from the low-pressure manifold 44 to the reservoir 56, and by operating the pump 60, the hydraulic oil flows from the reservoir 56 to the low-pressure manifold 44.

Furthermore, the high-pressure manifold 42 and the low-pressure manifold 44 are connected by a bypass pipe 62, and by opening a high-pressure relief valve 64 provided in the bypass pipe 62, the hydraulic oil flows directly from the high-pressure manifold 42 to the low-pressure manifold 44.

Figure 3:
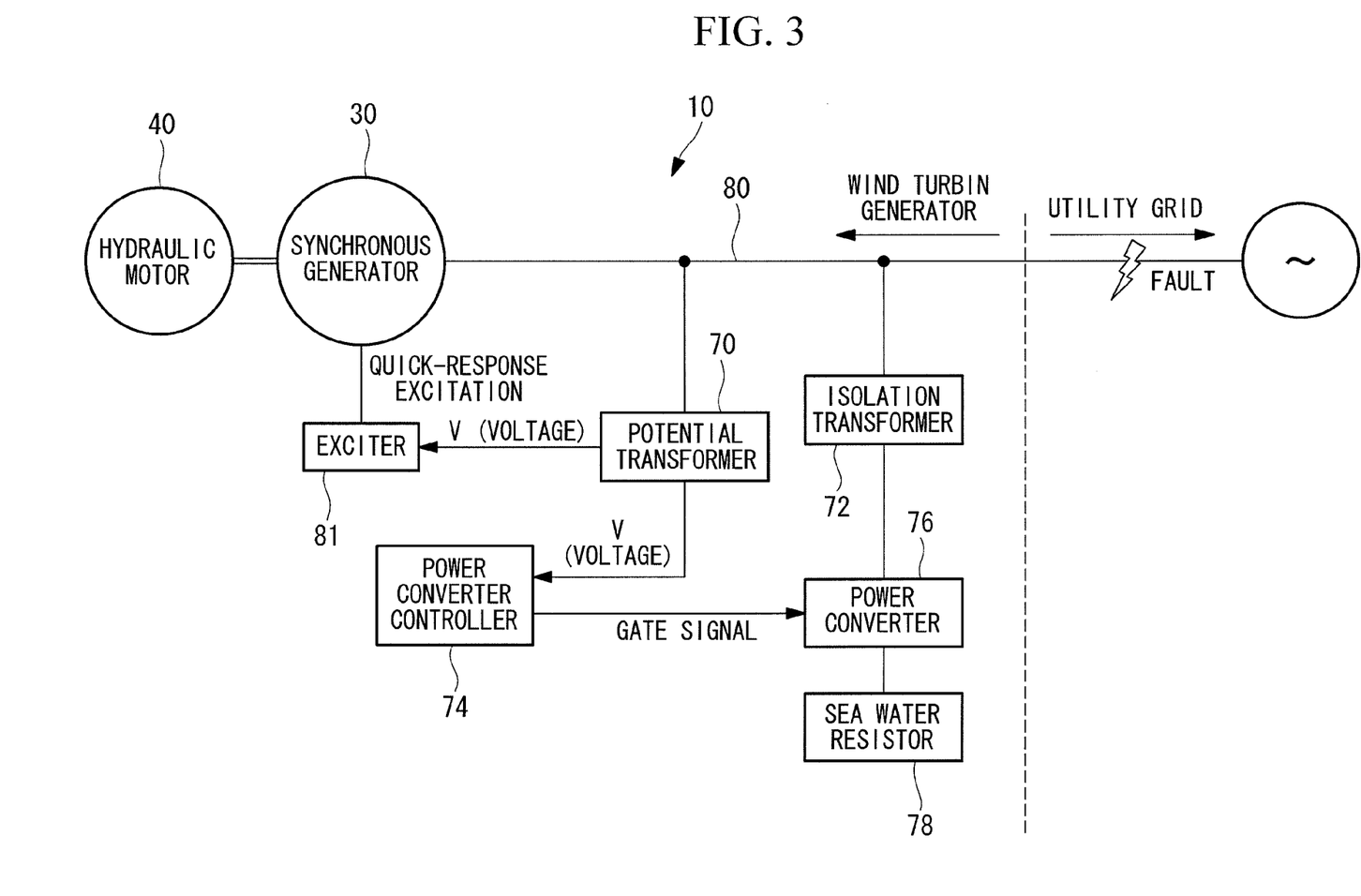
FIG. 3 is a diagram showing the electrical configuration involved in consumption of surplus energy in the wind turbine generator according to the first embodiment.

FIG. 3 is a diagram showing the electrical configuration involved in the consumption of surplus energy of the wind turbine generator 10 according to the first embodiment.

The wind turbine generator 10 includes a potential transformer 70, an isolation transformer 72, a power converter controller 74, a power converter 76, and a sea water resistor 78.

The potential transformer 70 is connected to a bus-bar 80 that connects the output of the synchronous generator 30 with the utility grid, transforms the voltage flowing in the bus-bar 80, and applies the transformed voltage to an exciter 81 that excites a magnetic field in the synchronous generator 30. In addition, the voltage output from the potential transformer 70 is also input to the power converter controller 74.

The isolation transformer 72 transforms the voltage flowing in the bus-bar 80 and transfers the transformed voltage to the power converter 76.

The power converter 76 is formed of a thyristor, which is a semiconductor switch, is driven in response to a gate signal sent from the power converter controller 74, and transfers the power from output terminals to the sea water resistor 78.

The sea water resistor 78, which is a liquid resistor using sea water as the resistive element, consumes, in the form of electrical power, the surplus energy that cannot be supplied to the utility grid among the electrical power generated at the synchronous generator 30.

The power converter controller 74 receives the voltage output from the potential transformer 70 and, based on fluctuations in this voltage, detects the occurrence of momentary power interruptions or sudden voltage drops caused by faults in the utility grid. When a voltage drop occurs on the utility grid, the output power that can be supplied to the utility grid is small relative to the synchronous generator 30 input power, resulting in surplus energy.

Then, when the power converter controller 74 detects the voltage drop, it sends the gate signal to the power converter 76 to drive the power converter 76, and the surplus energy (electric power) is sent to the sea water resistor 78 where it is consumed.

Note that the power controller 74 varies the on and off times of the thyristor constituting the power converter 76 according to the gate signal sent to the power converter 76 and controls the electric power according to the surplus energy sent to the sea water resistor 78.

In addition, because the power converter controller 74 is connected to an uninterruptible power supply (not shown), even if a power interruption occurs, it is supplied with operating power.

Figure 4:
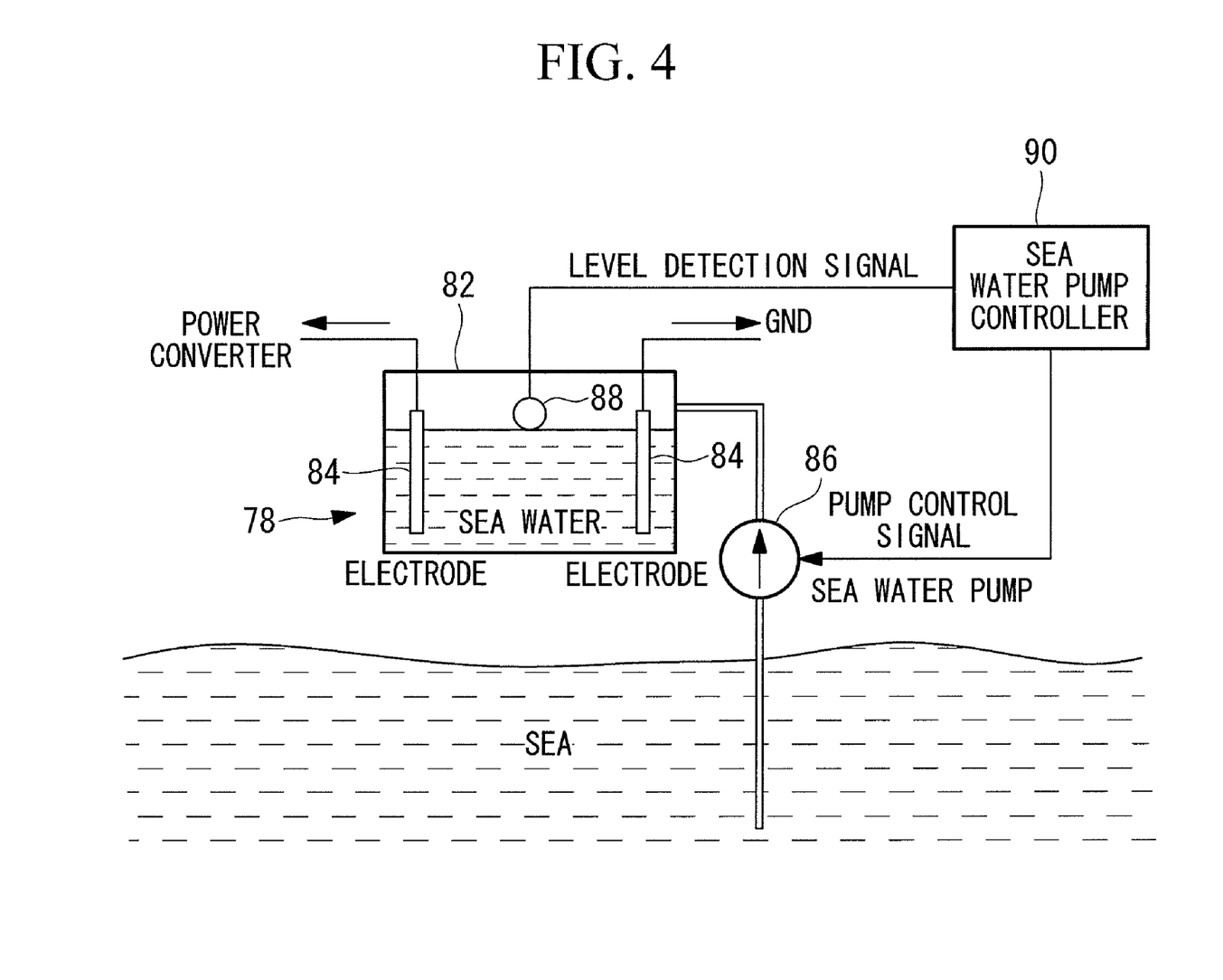
FIG. 4 is a configuration diagram of a sea water resistor according to the first embodiment.

FIG. 4 is a diagram showing the configuration of the sea water resistor 78 according to the first embodiment.

In the sea water resistor 78, sea water is drawn into a vessel 82 from the sea, and the sea level, that is to say, the height of the liquid surface, in the vessel 82 is kept at a prescribed value. The resistance of the sea water resistor 78 is determined by the amount of sea water in the vessel 82, the size of the electrodes 84, etc.

The sea water is drawn into the vessel 82 by a sea water pump 86, and the height of the liquid surface is detected by a liquid level sensor 88. Then, a level detection signal that indicates the liquid surface height output from the liquid level sensor 88 is transmitted to a sea water pump controller 90. When the liquid surface height indicated by the level detection signal is less than the prescribed value, the sea water pump controller 90 drives the sea water pump 86 to draw sea water into the vessel 82 until the liquid surface height reaches the prescribed value. Accordingly, the resistance of the sea water resistor is kept constant.

Then, the two electrodes 84 are immersed in the sea water in the vessel 82; one of the electrodes 84 is connected to an output terminal of the power converter 76, and the other electrode 84 is grounded.

The sea water resistor 78 may be installed at any position, such as below the tower 14, inside the tower 14, etc., so long as sea water can be taken in.

Figure 5A:
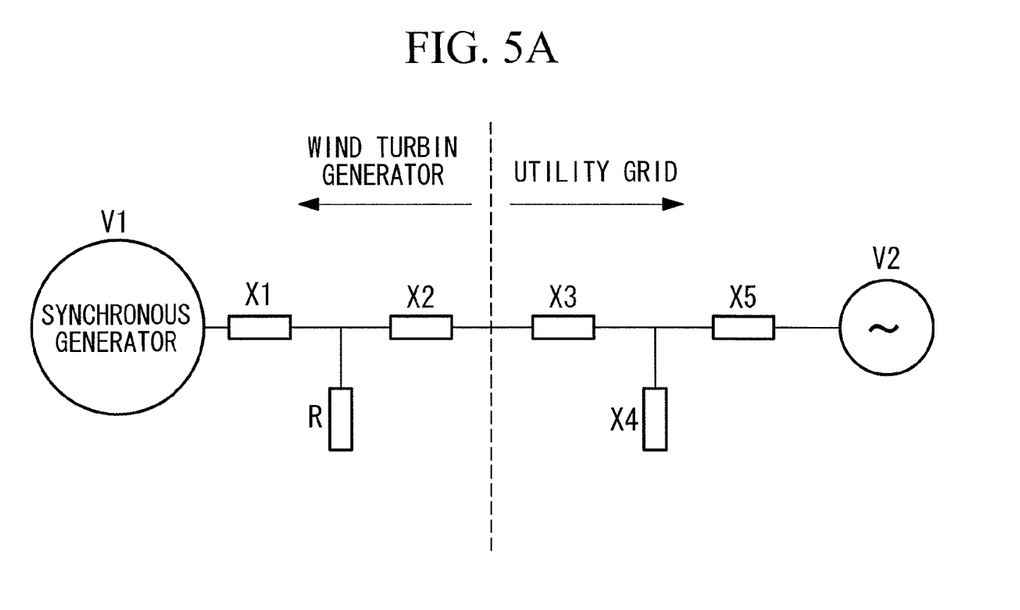
FIG. 5A is a diagram showing the placement of each component constituting the reactances contained in the wind turbine generator and the utility grid according to the first embodiment.
Figure 5B:
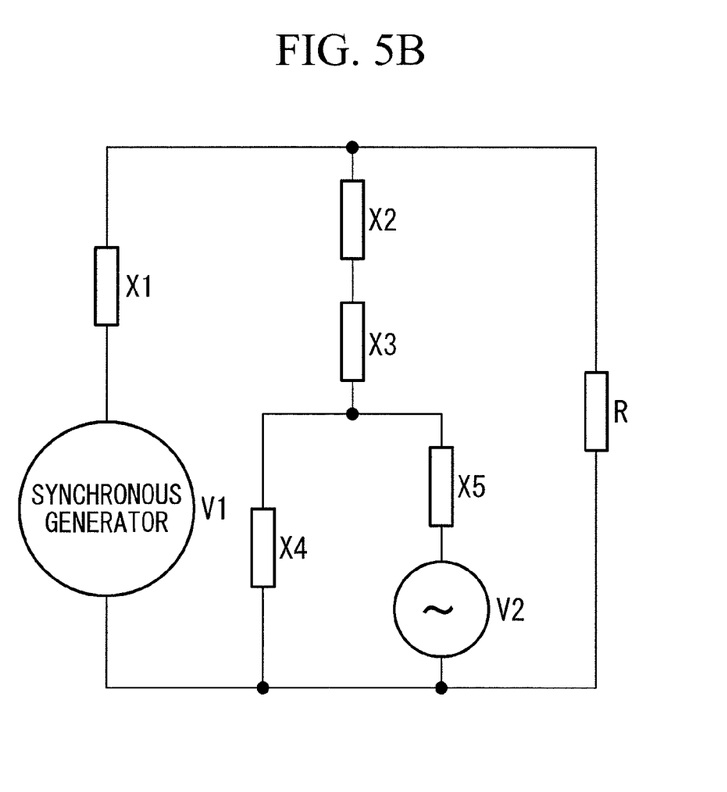
FIG. 5B is an equivalent circuit diagram of FIG. 5A.

Next, the consumption of the surplus energy in the wind turbine generator 10 according to the first embodiment of the present invention will be concretely described with reference to FIGS. 5A and 5B. FIG. 5A shows the placement of individual structures serving as reactances contained in the wind turbine generator 10 and the utility grid, and FIG. 5B is an equivalent circuit diagram of FIG. 5A.

In FIG. 5A, a system in which, for each device, a grid power source with a capacity of 100 MW is connected to a wind turbine generator 10 with a capacity of 3.5 MW is assumed as an example.

A reactance of the synchronous generator 30 (hereinafter referred to as "wind turbine generator reactance") X1 and a transformer reactance (hereinafter referred to as "wind turbine transformer reactance") X2 are included as reactances at the wind turbine generator 10 side. On the other hand, a reactance from the wind turbine generator 10 to a fault point where a fault occurs on the utility grid (hereinafter referred to as "transmission line reactance") X3, a reactance at the fault point (hereinafter referred to as "fault-point reactance") X4, and a reactance from the fault point to the grid power source (hereinafter referred to as "grid reactance") X5 are included as reactances at the utility grid side. In addition the induced voltage of the synchronous generator 30 is V1, the grid voltage is V2, and the resistance of the sea water resistor 78 is R.

Thus, in this example, the wind turbine generator reactance X1 is assumed to be 0.2 pu, on the basis of 3.5 MW, and the wind turbine transformer reactance X2 is assumed to be 0.15 pu, on the basis of 3.5 MW. Also, in this example, the grid reactance X5 is assumed to be 0.035 pu, on the basis of 3.5 MW, the fault-point reactance X4 is assumed to be ⅒ (one tenth) of the grid reactance X5, and the transmission line reactance X3 is assumed to be ⅒ of the grid reactance X5.

In addition, in this example, the resistance R of the sea water resistor 78 is assumed to be 0.4 pu, on the basis of 3.5 MW.

Under these assumptions, the voltage at the output terminal of the synchronous generator 30 drops to about 49%. Note the this voltage drop, as described above, is detected by the power converter controller 74 from the voltage output from the potential transformer 70. Thus, although the active power of the synchronous generator 30 corresponding to the voltage drop also falls, assuming that the voltage and the active power are in a proportional relationship, the output power of the synchronous generator 30 also drops to 49%.

As a result, at the wind turbine generator 10, with an input power of 3.5 MW, 1.785 MW (3.5 MW×0.51) becomes surplus input power, and this surplus input power causes the rotor of the synchronous generator 30 to accelerate.

The resistance of the sea water resistor 78 for processing this surplus input power is 0.4 pu, or 5Ω/phase when represented in Ohms.

If the resistance of the sea water resistor 78 were assumed to be 1Ω/phase, the power converter controller 74 would control the electric power sent to the sea water resistor 78 by controlling the phase to vary the firing angle of the thyristor in the power converter 76 so that the resistance becomes equivalently 5Ω/phase, that is to say, so that the consumed electric power at the sea water resistor 78 becomes 1.785 MW.

If the utility grid does not recover within a certain time, the wind turbine generator 10 is disconnected from the utility grid.

If the voltage drop of the utility grid is very small (for example, 0.01 pu or less), the surplus energy is absorbed in the accumulator 45H and the accumulator 45L without being consumed at the sea water resistor 78 in the form of electric power.

As described above, the wind turbine generator 10 according to the first embodiment includes the rotor 18 provided with blades that receive wind, the synchronous generator 30 that generates power by rotation of the rotor 18 and that supplies the generated electric power to the utility grid, and the sea water resistor 78, in which sea water serves as the resistive element, which consumes surplus electric power that cannot be supplied to the utility grid from among the electric power generated at the synchronous generator 30.

Because the sea water resistor 78 uses sea water, the problem of heat generation hardly ever arises, and the exchange of sea water is easy; therefore, it is not affected by lifetime or on-time limitations, and the response speed for consuming energy in the form of electric power is fast. Accordingly, the wind power generator 10 according to this embodiment is not affected by lifetime or on-time limitations, and surplus energy can be consumed with a fast response speed. In addition, disconnection of the wind turbine generator 10 can be prevented by consuming surplus energy in this way, thus also contributing to stabilization of the utility grid.

The wind turbine generator 10 according to the first embodiment controls the electric power sent to the sea water resistor 78 by varying the firing angle of the thyristor constituting the power converter 76; therefore, it is possible to easily control the electric power to be consumed in the sea water resistor 78.

Second Embodiment

A second embodiment of the present invention will be described below.

The configuration of a wind turbine generator 10 according to the second embodiment is the same as the configuration of the wind turbine generator 10 according to the first embodiment shown in FIGS. 1 and 2, and a description thereof will be omitted.

Figure 6:
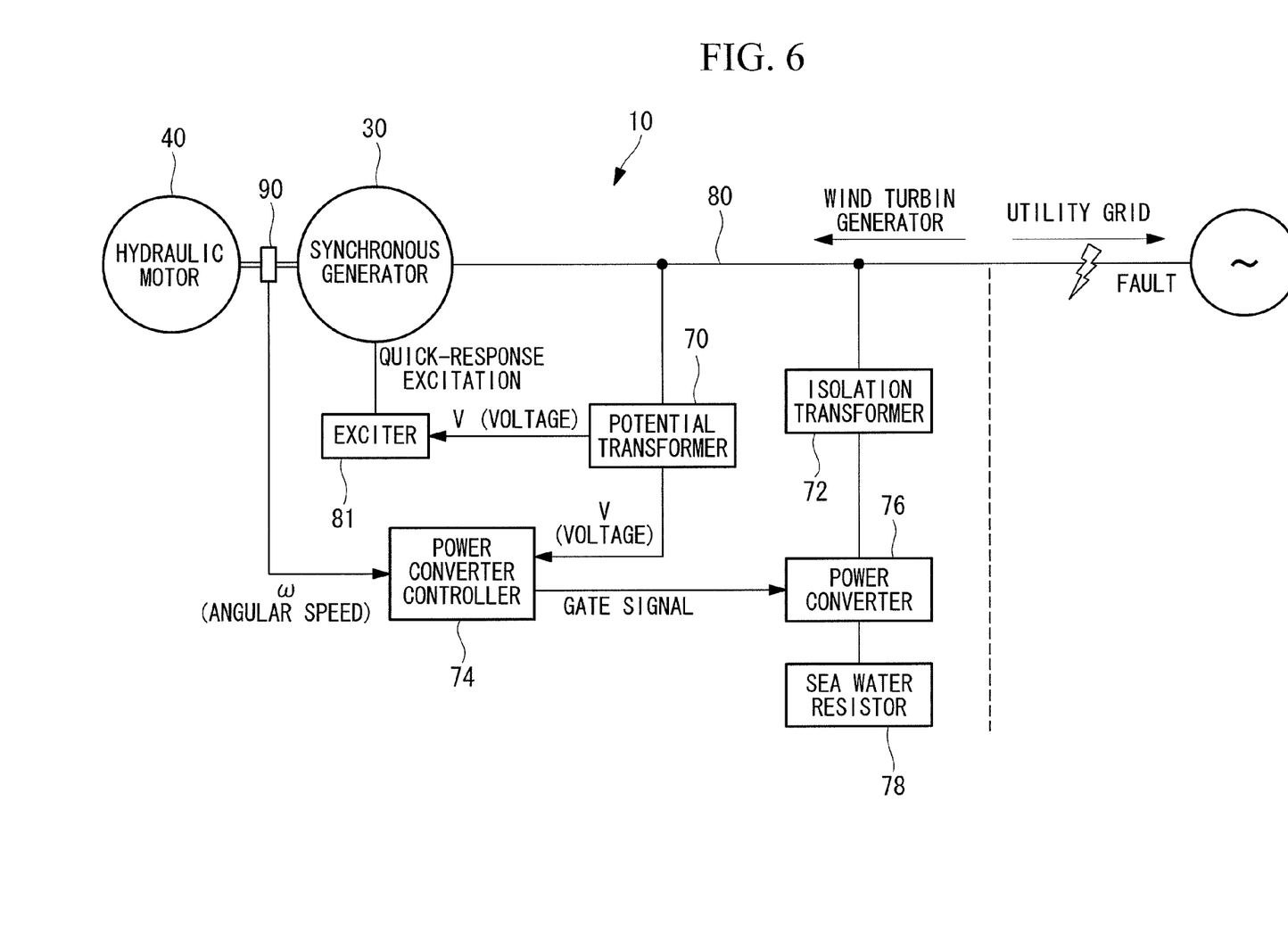
FIG. 6 is a diagram of the electrical configuration involved in the consumption of surplus energy in the wind turbine generator according to the second embodiment.

FIG. 6 shows the electrical configuration involved in the consumption of surplus energy (electric power) in the wind turbine generator 10 according to the second embodiment. Constituent parts in FIG. 6 that are the same as those in FIG. 3 are assigned the same reference numerals as those in FIG. 3, and a description thereof will be omitted.

An angular speed sensor 90 that detects the angular speed of the shaft 38 is provided on the shaft 38 that joins the hydraulic motor 40 and the synchronous generator 30, and the detected angular speed is transmitted to the power converter controller 74. Then, the power converter controller 74 controls the phase of the thyristor in the power converter 76 to control the output power sent to the sea water resistor so the angular speed ($\omega$) of the shaft 38 is kept at the synchronous speed.

The control performed by the power converter controller 74 according to the second embodiment is described more specifically below.

When the voltage of the utility grid drops, the power converter controller 74 first drives the power converter 76 by sending the gate signal to the power converter 76, based on the voltage output from the potential transformer 70, causing the surplus electric power to be consumed in the sea water resistor 78.

Here, while the surplus electric power is being consumed in the sea water resistor 78, if the angular speed of the shaft 38 falls below the synchronous speed, the power converter controller 74 controls the phase of the thyristor in the power converter 76 so that the electric power consumed in the sea water resistor 78 decreases. On the other hand, if the angular speed of the shaft 38 rises above the synchronous speed, the power converter controller 74 controls the phase of the thyristor in the power converter 76 so that the electric power consumed in the sea water resistor 78 increases.

Although the present invention has been described above using the embodiments, the technical scope of the present invention is not limited to the scope stated in the individual embodiments described above. Various modifications and improvements can be made to the embodiments described above, so long as they do not depart from the spirit of the invention, and other forms in which such modifications or improvements are made are also encompassed by the technical scope of the present invention.

For example, in the above-mentioned embodiments, a description has been given of a form in which the power converter 76 is configured as a thyristor; however, the present invention is not limited thereto. A form in which the power converter is configured as a triac etc. having two thyristors connected back-to-back, or as another semiconductor switch is also permitted.

REFERENCE SIGNS LIST

10 WIND TURBINE GENERATOR
18 ROTOR
20 BLADE
30 SYNCHRONOUS GENERATOR
40 HYDRAULIC MOTOR
45H ACCUMULATOR
45L ACCUMULATOR
76 POWER CONVERTER
78 SEA WATER RESISTOR
82 VESSEL

The invention claimed is:

1. A wind turbine generator comprising:
a rotor provided with a blade that receives wind;
a synchronous generator that generates electric power by rotation of the rotor and that supplies the generated electric power to a utility grid; and
a liquid resistor in which sea water serves as a resistive element and which consumes surplus electric power that cannot be supplied to the utility grid from among the electric power generated at the synchronous generator.

2. A wind turbine generator according to claim 1, further comprising a power conversion unit, provided between an output terminal of the synchronous generator and the liquid resistor and formed of a semiconductor switch, for controlling the electric power sent to the liquid resistor by varying a firing angle of the semiconductor switch.

3. A wind turbine generator according to claim 1, further comprising:
an angular speed detecting unit for detecting an angular speed of a rotating shaft of the synchronous generator;
wherein the electric power sent to the liquid resistor is controlled so that the angular speed detected by the angular speed detecting unit is held at a synchronous speed.

4. A wind turbine generator according to claim 1, wherein in the liquid resistor, sea water is taken into a vessel from the sea, and the height of the liquid surface in the vessel is kept at a prescribed value.

5. A wind turbine generator according to claim 1, further comprising:
a hydraulic motor that speeds up the rotation speed of the rotor and transmits the sped-up rotation to the synchronous generator; and
an accumulator that stores hydraulic oil flowing in and out of the hydraulic motor.

6. A surplus energy control method for a wind turbine generator equipped with a rotor that is provided with a blade that receives wind, a synchronous generator that generates electric power by rotation of the rotor and that supplies the generated electric power to a utility grid, and a liquid resistor in which sea water serves as a resistive element, the surplus energy control method comprising:
a first step of detecting a voltage drop in the utility grid; and
a second step of sending surplus electric power that cannot be sent to the utility grid, which occurs due to the voltage drop in the utility grid, to the liquid resistor and causing the electric power to be consumed therein.

* * * * *